(12) United States Patent
Awata et al.

(10) Patent No.: US 9,616,791 B2
(45) Date of Patent: Apr. 11, 2017

(54) SEAT CONFIGURATION MEMBER AND VEHICLE SEAT EMPLOYING THE SEAT CONFIGURATION MEMBER

(75) Inventors: Shinji Awata, Aichi-gun (JP); Hideki Kobayashi, Miyoshi (JP); Hisaya Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 14/117,581

(22) PCT Filed: May 18, 2011

(86) PCT No.: PCT/JP2011/061456
§ 371 (c)(1),
(2), (4) Date: Nov. 18, 2013

(87) PCT Pub. No.: WO2012/157099
PCT Pub. Date: Nov. 22, 2012

(65) Prior Publication Data
US 2014/0070594 A1    Mar. 13, 2014

(51) Int. Cl.
*B60R 21/207* (2006.01)
*B60N 2/64* (2006.01)
(Continued)

(52) U.S. Cl.
CPC ............. *B60N 2/64* (2013.01); *B60N 2/5825* (2013.01); *B60N 2/686* (2013.01); *B60N 2/7094* (2013.01);
(Continued)

(58) Field of Classification Search
CPC ........ B60R 2021/23146; B60R 21/207; B60N 2/7094; B60N 2002/5808; B60N 2/64
(Continued)

(56) References Cited

U.S. PATENT DOCUMENTS 5,890,733 A * 4/1999 Dillon .................... B60R 21/20
280/728.2
5,893,579 A    4/1999 Kimura et al.
(Continued)

FOREIGN PATENT DOCUMENTS

DE  10 2006 014381 A1   10/2007
JP  A-10-250522          9/1998
(Continued)

OTHER PUBLICATIONS

Nov. 11, 2014 Partial Supplementary European Search Report issued in European Application No. 11865492.0.
(Continued)

*Primary Examiner* — David R Dunn
*Assistant Examiner* — Tania Abraham
(74) *Attorney, Agent, or Firm* — Oliff PLC

(57) ABSTRACT

A seat configuration member and a vehicle seat employing the seat configuration member are provided that are capable of covering reclining mechanism components and maintaining a high quality external appearance of the vehicle seat, and are moreover capable of achieving a reduction in the number of components. A lower side coupling and fixing portion disposed on a seat width direction outer side of a seat back board that is made from resin is integrally formed with an attachment portion that is L-shaped in plain view. A side airbag device is attached to a horizontal wall portion of the attachment portion. A seatback pad and a cover are mounted to the seat back board configured as described above, and the seat back board is assembled to side frames of a seatback frame.

11 Claims, 8 Drawing Sheets

(51) Int. Cl.
   *B60N 2/58* (2006.01)
   *B60N 2/68* (2006.01)
   *B60N 2/70* (2006.01)
   *B60R 21/231* (2011.01)

(52) U.S. Cl.
   CPC .... *B60R 21/207* (2013.01); *B60N 2002/5808* (2013.01); *B60R 2021/23146* (2013.01)

(58) Field of Classification Search
   USPC .................................................. 297/216.13
   See application file for complete search history.

(56) References Cited

U.S. PATENT DOCUMENTS

| | | | | |
|---|---|---|---|---|
| 5,918,898 | A * | 7/1999 | Wallner | B60R 21/207 280/728.2 |
| 5,951,039 | A * | 9/1999 | Severinski | B60R 21/207 280/728.2 |
| 5,967,547 | A * | 10/1999 | Narita | B60R 21/207 280/728.2 |
| 5,975,567 | A * | 11/1999 | Higashiura | 280/730.2 |
| 5,997,032 | A | 12/1999 | Miwa et al. | |
| 6,050,636 | A * | 4/2000 | Chevallier et al. | 297/216.13 |
| 6,234,518 | B1 * | 5/2001 | Ryl | B60R 21/207 280/730.2 |
| 6,352,304 | B1 * | 3/2002 | Sorgenfrei | 297/216.13 |
| 7,284,768 | B2 * | 10/2007 | Tracht | B60R 21/207 280/728.2 |
| 7,331,601 | B2 * | 2/2008 | Tracht | B60R 21/207 280/728.2 |
| 7,341,275 | B2 * | 3/2008 | Miyake | B60R 21/207 280/730.2 |
| 7,669,888 | B2 * | 3/2010 | Sato | B60R 21/207 280/730.2 |
| 7,677,594 | B2 * | 3/2010 | Hazlewood | B60N 2/5883 280/728.2 |
| 8,177,256 | B2 * | 5/2012 | Smith | B60R 21/207 280/728.2 |
| 2002/0084630 | A1 * | 7/2002 | Aulbach | B60R 21/207 280/728.2 |
| 2004/0183356 | A1 * | 9/2004 | Philippot et al. | 297/452.18 |
| 2008/0129021 | A1 | 6/2008 | Bozintan et al. | |

FOREIGN PATENT DOCUMENTS

| | | |
|---|---|---|
| JP | A-2000-313302 | 11/2000 |
| JP | A-2002-166765 | 6/2002 |
| JP | A-2007-126029 | 5/2007 |
| JP | A-2008-296642 | 12/2008 |
| JP | 2009095597 A * | 5/2009 |
| JP | A-2009-143379 | 7/2009 |
| JP | 2009172091 A | 8/2009 |
| JP | A-2010-511569 | 4/2010 |
| JP | A-2010-111352 | 5/2010 |

OTHER PUBLICATIONS

Feb. 10, 2015 Office Action issued in Russian Application No. 2013152262/11(081558).
Mar. 26, 2015 Extended Search Report issued in European Application No. 11 86 5492.0.

* cited by examiner

SEAT CONFIGURATION MEMBER AND VEHICLE SEAT EMPLOYING THE SEAT CONFIGURATION MEMBER

TECHNICAL FIELD

The present invention relates to a seat configuration member and a vehicle seat employing the seat configuration member.

BACKGROUND ART

Patent Document 1 below discloses a vehicle seat provided with a side airbag device that inflates and deploys a side airbag between a door trim of a side door and the side of a seated occupant in event of a side-on collision. The side airbag device is generally inbuilt into a side portion on a seat width direction outer side of a vehicle seat.

Patent Document 1: Japanese Patent Application Laid-Open (JP-A) No. 2000-313302

DISCLOSURE OF INVENTION

Technical Problem

However, when vehicle seats are provided with a side airbag device such as in the related technology described above, the ease of assembly of the seatback can suffer. Generally, in the assembly of vehicle seat seatbacks, processes are widely employed in which a seatback frame subassembly and a seatback pad subassembly are prepared in advance, with the latter then being assembled to the thither. Note that the seatback frame subassembly refers to an assembled state of for example a seat spring and/or wires to a seatback frame. The seatback pad subassembly refers to a state in which a seatback pad has been covered by a cover (skin). When a side airbag device provided with a force cloth is inbuilt into a seatback side portion of the vehicle seat as in the related technology above, the side airbag device is fixed to a side frame, however the force cloth is sometimes provided in advance in a sewn state to a rear face of the cover. In such cases, at the assembly factory sometimes the cover is rolled up, and a metal bracket provided to an end portion of the force cloth is fixed to the side frame after the 2 subassemblies have been assembled together. There is a need to provide fasteners to the cover in order to roll up the cover. Such an assembly operation consequently becomes complicated, and limits the degrees of freedom for assembly, as well as increasing the number of components.

In consideration of the above circumstances, an object of the present invention is to obtain a seat configuration member and a vehicle seat employing the seat configuration member, that are capable of maintaining good ease of assembly of a seatback and also capable of increasing the degrees of freedom for assembly even when a side airbag device is provided, as well as enabling a reduction in the number of components.

Solution to Problem

A seat configuration member according to claim 1 of the present invention is configured from a resin material and includes: a pair of left and right respective side portions that are respectively fixed to a pair of left and right side frames provided at a seatback frame;

at least one back spring body portion disposed along a seat width direction between a back board portion disposed at a back face side of the seatback frame and the pair of left and right side frames; and an attachment portion that is integral with or integrally provided at the side portion disposed at a seat width direction outer side, and that includes an attachment seating employed when attaching a side airbag device that inflates and deploys a side airbag toward a seat front side in the event of a side-on collision.

A seat configuration member of claim 2 of the present invention the invention of claim 1, wherein the respective side portions of the seat configuration member fit together with front sides of the side frames.

A seat configuration member according to claim 3 of the present invention is the seat configuration member of either claim 1 or claim 2, further including a cloth form tension transmission member that is disposed at least at a seat width direction inside of the side airbag that deploys, and that transmits tension received from the side airbag as a pulling force that pulls open a splitting portion set in a cover.

A seat configuration member according to claim 4 of the present invention is the seat configuration member of claim 3, wherein: an insertion through-hole through which the tension transmission member is inserted is formed at a seat width direction outer side side portion of the seat configuration member; and the tension transmission member is passed through the insertion through-hole and is fixed to the attachment portion.

A seat configuration member according to claim 5 of the present invention is the seat configuration member of any one of claim 1 to claim 4, wherein: the attachment portion is includes a vertical wall portion that extends in a seat front-rear direction so as to cover at least a portion of an outside face of the side frame positioned on the seat width direction outer side, and a horizontal wall portion that extends from the vertical wall portion towards the seat width direction outer side, and that configures the attachment seating of the attachment portion; and a back face side of the horizontal wall portion is provided with a reaction force receiving portion that extends in a direction intersecting with the horizontal wall portion, and that receives a deployment reaction force of the side airbag.

A seat configuration member according to claim 6 of the present invention is the seat configuration member of claim 5, wherein the reaction force receiving portion comprises a rib with one end connected to the horizontal wall portion and the other end disposed so as to be capable of contacting the side frame.

A seat configuration member according to claim 7 of the present invention is the seat configuration member of either claim 5 or claim 6, wherein the reaction force receiving portion is formed within a range enclosed by an outside face of the side frame positioned to the seat width direction outer side, a seat front-rear direction rear face of the horizontal wall portion, and a plane that joins together a seat front-rear direction rear end of the outside face and a seat width direction outer side end of the rear face.

A seat configuration member according to claim 8 of the present invention is the seat configuration member of any one of claim 1 to claim 7, wherein: the respective side portions, the back spring body portion, and the back board portion are integral with or integrally provided at the seat configuration member; and plural tiers of the back spring body portions are provided along the seatback height direction.

A seat configuration member according to claim 9 of the present invention is the seat configuration member of any one of claim 1 to claim 7, wherein the side airbag device is attached to the attachment portion.

A vehicle seat according to claim 10 of the present invention includes: a seatback frame provided with a pair of left and right side frames; the seat back board of any one of claim 1 to claim 9, supported at the pair of left and right side frames of the seatback frame; a seatback pad disposed at a front face side of the seat back board; and a cover that covers a front face of the seatback pad.

According to the first aspect, both side portions of the seat configuration member are fixed to the pair of left and right side frames of the seatback frame. Thus in cases in which the back board portion is provided the back board portion is disposed at the back face side of the seatback frame, and in cases in which the back spring body portion is provided the back spring portion is disposed along the seat width direction between the left and right pair of side frames. Note that in cases in which the back spring body portion is provided, the back spring body portion undergoes flexing deformation in a load application direction when an occupant sits in the vehicle seat applied with the seat configuration member, thereby securing cushioning properties of the seatback.

Note that in the present aspect, the attachment portion is integral with or integrally provided at the side portion that is disposed on a seat width direction outer side, and the side airbag device is attached to the attachment portion. The side airbag device can accordingly be integrated in advance on the resin seat configuration member side. Accordingly, when assembling the seatback of a vehicle seat, it is sufficient simply to fix both side portions of the seat configuration member to which the side airbag device has been integrated to the left and right side frames of the seatback frame. In particular, even when a force cloth is set at a back face side of a cover, wrapping the force cloth around the side airbag device can be completed prior to assembling the seat configuration member to the seatback frame since the side airbag device is assembled to the seat configuration member side in advance. The need to fix metal brackets of the force cloth to the side frame whilst rolling up the cover, that is required in conventional configurations, is thereby dispensed with. The ease of assembly of the seatback can be improved as a result. Since there is no need to roll up the cover, there is no longer a need to set fasteners on the cover. The number of components can accordingly be reduced in this respect.

According to the second aspect, it is easier to support the seat configuration member on the seatback frame since the respective side portions of the seat configuration member fit together with the side frame front side.

According to the third aspect, during deployment of the side airbag, tension is generated in the cloth form tension transmission member disposed at least to the seat width direction inside of the side airbag. This tension is transmitted through the tension transmission member to the splitting portion set in the cover. The splitting portion is accordingly pulled in a pulling apart direction. As a result, the splitting portion splits open and the side airbag inflates and deploys towards the seat front side.

According to the fourth aspect, the insertion through-hole is formed to the seat width direction outer side side portion of the seat configuration member, and the tension transmission member is passed through the insertion through-hole and fixed to the attachment portion of the seat configuration member. The layout path of the tension transmission member can accordingly be shortened.

According to the fifth aspect, the reaction force receiving portion is includes the vertical wall portion and the horizontal wall portion. Since the side airbag device is attached with the horizontal wall portion configuring the attachment seating, when the side airbag deploys, a deployment reaction force is transmitted to the horizontal wall portion. However, in the present aspect, the reaction force receiving portion is provided at the back face side of the horizontal wall portion. The deployment reaction force of the side airbag acting on the horizontal wall portion is accordingly supported by the reaction force receiving portion. The side airbag accordingly inflates and deploys with a desired timing and in the desired direction.

According to the sixth aspect, the rib can be integrally molded during molding of the seat configuration member due to configuring the rib with one end connected to the horizontal wall portion and the other end disposed so as to be capable of contacting the side frame.

According to the seventh aspect, the likelihood of a seatback pad impinging on the rib can be reduced due to forming the rib within the range enclosed by the outside face of the side frame positioned to the seat width direction outer side, the seat front-rear direction rear face of the horizontal wall portion, and the plane that joins together the seat front-rear direction rear end of the outside face and the seat width direction outer side end of the rear face.

According to the eighth aspect, since the respective side portions, the back spring body portion, and the back board portion are integral with or integrally provided at the seat configuration member, a reduction in the number of components can be achieved in comparison to cases in which these elements are provided separately. A reduction in weight can moreover be achieved in comparison to when metal seat springs are employed. The cushioning properties of the seatback can moreover be enhanced due to providing plural tiers of the back spring body portions in the seatback height direction.

According to the ninth aspect, the side airbag device is attached to the attachment portion of the seat configuration member, thereby enabling the side airbag device to be configured in a seat configuration member side subassembly. A process of assembling the side airbag device itself to the side frame of the seatback frame can accordingly be eliminated.

According to the tenth aspect, the vehicle seat is configured including the seatback frame, the seat back board, the seatback pad, and the cover. Since the seat back board employed is the seat configuration member of any one of claim 1 to claim 9, the vehicle seat can obtain the operation described above.

Advantageous Effects of Invention

As described above, the seat configuration member of the first aspect exhibits the excellent advantageous effects of enabling good ease of assembly to be maintained and of increasing the degrees of freedom in assembly of a seatback even when provided with a side airbag device, and also of enabling a reduction in the number of components.

The seat configuration member of the second aspect exhibits the excellent advantageous effect of enabling the ease of assembly of the seatback to be further enhanced.

The seat configuration member of the third aspect exhibits the excellent advantageous effect of enabling the side airbag to be swiftly deployed towards the seat front side in event of a side-on collision.

The seat configuration member of the fourth aspect exhibits the excellent advantageous effect of enabling inflation pressure of the side airbag to be efficiently transmitted to the tension transmission member.

The seat configuration member of the fifth aspect exhibits the excellent advantageous effect of enabling the side airbag to inflate and deploy swiftly and precisely.

The seat configuration member of the sixth aspect exhibits the excellent advantageous effect of enabling an increase in the number of components to be suppressed and a enabling a cost saving to be achieved.

The seat configuration member of the seventh aspect exhibits the excellent advantageous effect of enabling damage to a seatback pad caused by the rib to be suppressed or prevented.

The seat configuration member of the eighth aspect exhibits the excellent advantageous effects of enabling the seating comfort of an occupant to be improved, and also of enabling a reduction in costs and a reduction in weight to be achieved.

The seat configuration member of the ninth aspect exhibits the excellent advantageous effect of enabling an assembly operation of a seatback provided with a side airbag, and therefore an assembly operation of a vehicle seat, to be performed easily and in a short space of time.

The vehicle seat of the tenth aspect exhibits the excellent advantageous effect of enabling good ease of assembly to be maintained for a seatback even when provided with a side airbag device, and moreover enables a reduction in the number of components to be achieved.

BEST MODE FOR CARRYING OUT THE INVENTION

First Exemplary Embodiment

Figure 1:
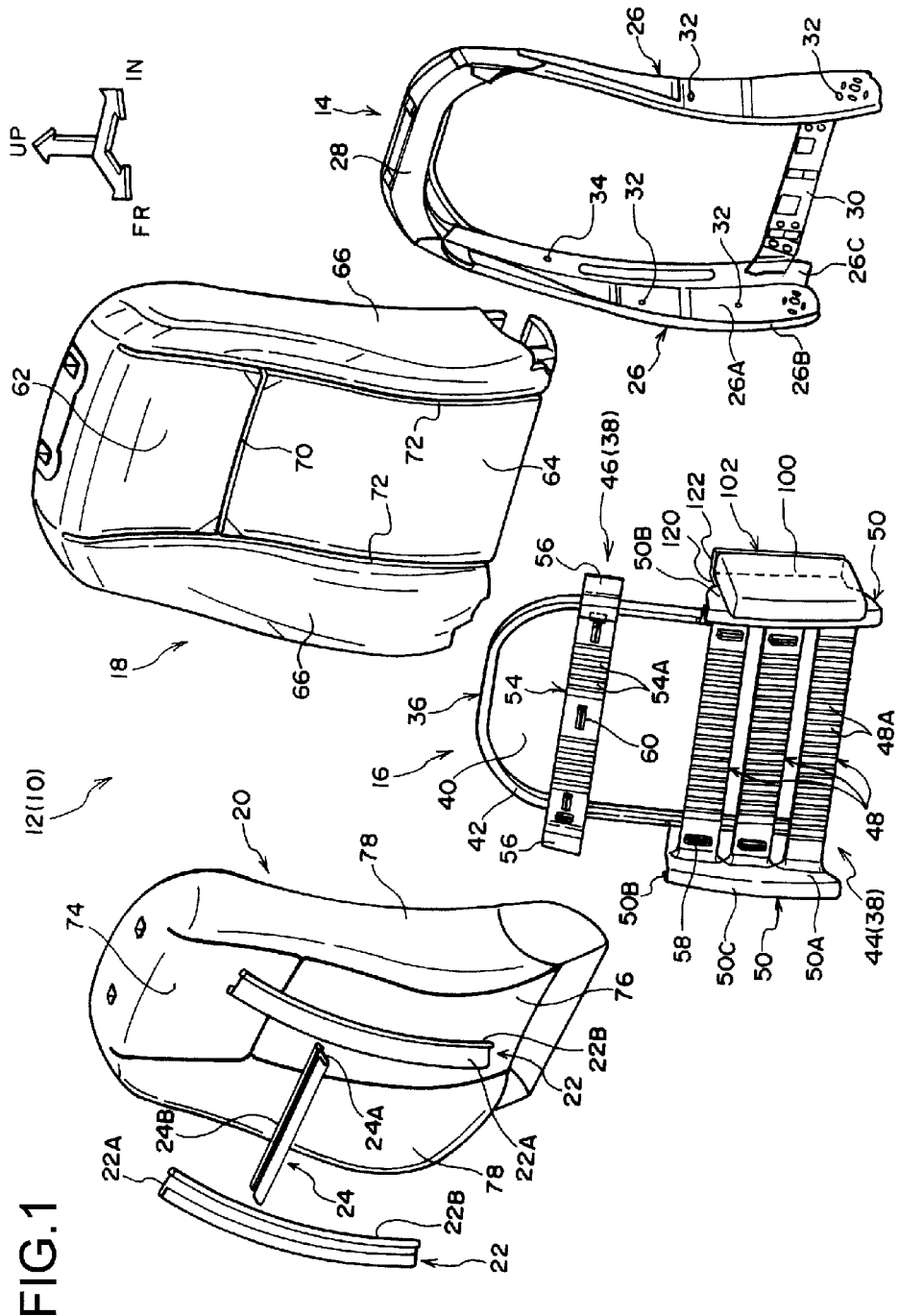
FIG. 1 is an exploded perspective view illustrating a seatback of a vehicle seat according to a first exemplary embodiment.

Explanation follows regarding a first exemplary embodiment of a seat configuration member and a vehicle seat employing the seat configuration member according to the present exemplary embodiment, with reference to FIG. 1 to FIG. 5. Note that in the drawings, the arrow FR indicates the vehicle front side, the arrow UP indicates the vehicle upper side, and the arrow IN indicates the vehicle width direction inside as appropriate.

Overall Configuration

Figure 4:
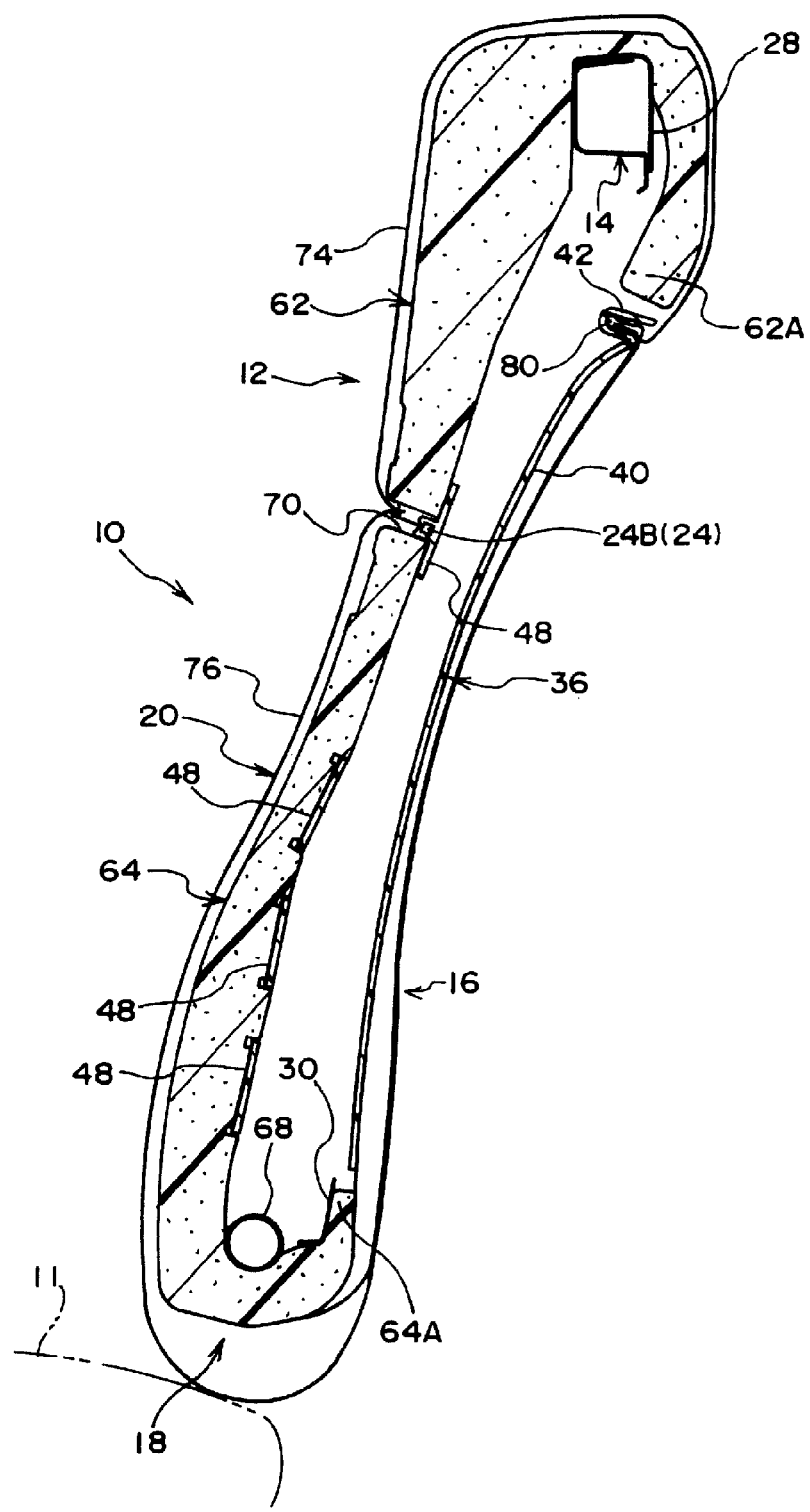
FIG. 4 is an enlarged vertical cross-section illustrating an assembled state of the seatback illustrated in FIG. 1.

FIG. 1 is an exploded perspective view illustrating a seatback corresponding to a backrest of a vehicle seat according to the present exemplary embodiment. Note that in FIG. 1, each of the elements are depicted as viewed from slightly different angles to each other. FIG. 4 is a vertical cross-section of a vehicle seat provided with the seatback. As illustrated in FIG. 1 and FIG. 4, a vehicle seat 10 is configured from a seat cushion 11 (see FIG. 4) on which an occupant sits, a seatback 12 that is reclinably supported at a rear end portion of the seat cushion 11, and a headrest, not illustrated in the drawings, that is supported at an upper end portion of the seatback 12 so as to be capable of moving up and down.

As illustrated in FIG. 1, the seatback 12 includes a seatback frame 14 that is made from metal and configures a framework member of the seatback 12, a resin spring integral back board (referred to below simply as "seat back board") 16 that is mounted to a front face side of the seatback frame 14, a seatback pad 18 that configures a cushion member of the seatback 12 and that is attached from a front face side of the seat back board 16 and supported by the seatback frame 14, a cover (skin) 20 that covers the front face that is the main face of the seatback pad 18, and vertical direction attachment members 22 and a horizontal direction attachment member 24 for attaching the cover 20 to the seat back board 16. Detailed explanation follows regarding each configuration element.

Seatback Frame 14 Configuration

As illustrated in FIG. 1 to FIG. 4, the seatback frame 14 is formed in a rectangular frame shape as viewed from the front (meaning as viewed from the front of the vehicle. In the following explanation, the orientation of the vehicle seat 10 corresponds to the orientation of the vehicle). Specifically, the seatback frame 14 is configured from a pair of left and right side frames 26 disposed facing each other across the vehicle width direction, an inverted substantially U-shaped upper frame 28 that connects together upper end portions of the left and right side frames 26, and a lower frame 30 that connects together lower end portions of the left and right side frames 26 across the vehicle width direction. The seatback 12 is manufactured by press forming the four members including the upper frame 28, however other frame structures may be adopted. For example, the upper frame alone may be configured from a pipe member bent into an inverted U-shape, or the upper frame and the pair of left and right side frames may be configured from a single pipe member bent into an inverted U-shape.

Figure 2:
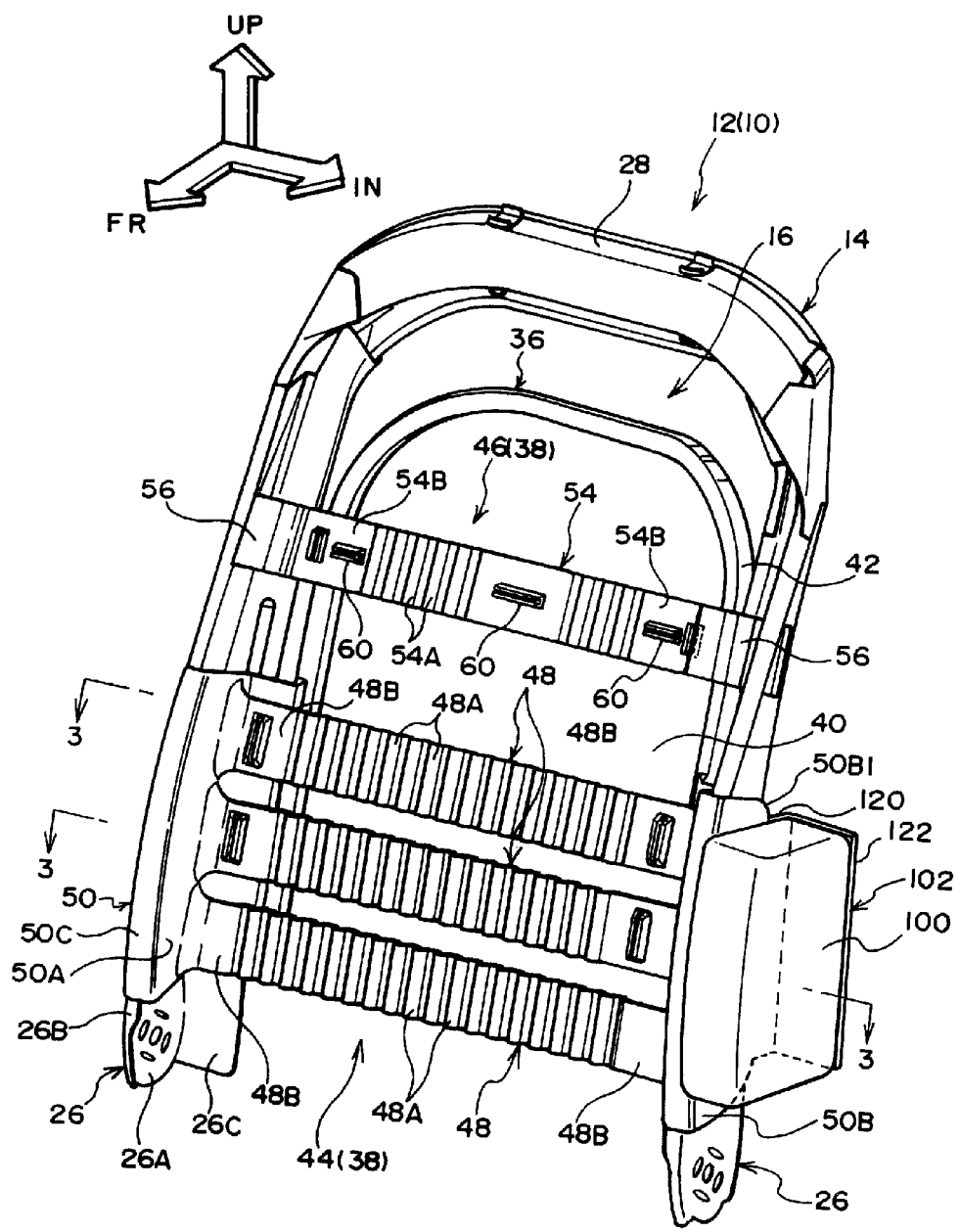
FIG. 2 is a perspective view illustrating an assembled state of a resin spring integral back board to the seatback frame illustrated in FIG. 1.
Figure 3:
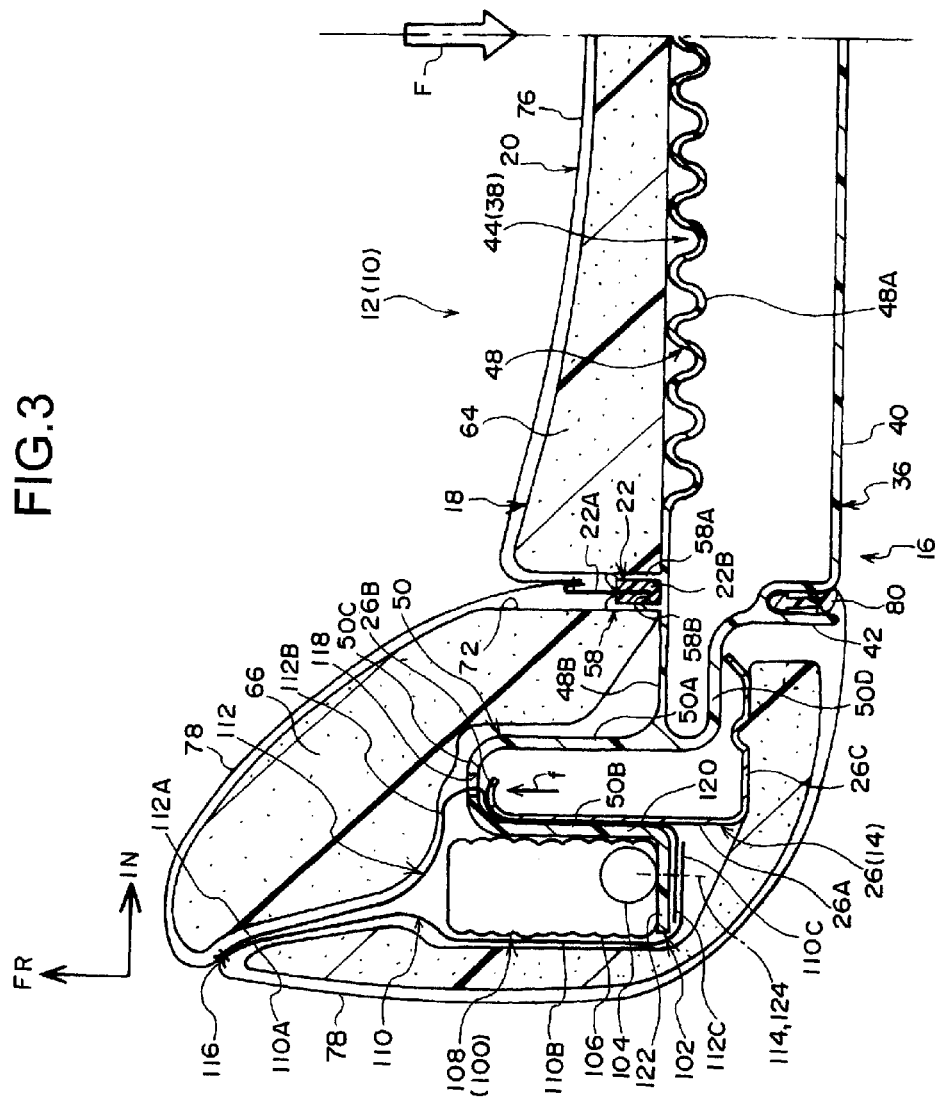
FIG. 3 is an enlarged plan view cross-section (a cross-section taken along line 3-3 in FIG. 2) illustrating an assembled state of the seatback illustrated in FIG. 1.

Explanation follows regarding the cross-section structure of the left and right side frames 26. As illustrated in FIG. 2 and FIG. 3, the side frames 26 are respectively configured by a side wall portion 26A, a front wall portion 26B and a rear wall portion 26C, that form substantially L-shaped profiles when viewed individually in plan view cross-section, and that form open cross-section profiles that are open towards the inside and that face each other along the seat width direction when viewed as a left and right pair in plan view cross-section. The side wall portion 26A is configured overall so as to narrow in width on progression from a lower end portion towards an upper end portion. A lower portion of the side wall portion 26A is formed with plural attachment holes 32 at top to bottom separations from each other (see FIG. 1). The front wall portion 26B extends from a front edge of the side wall portion 26A towards the seat width direction inside at a slight incline towards the rear side across a circular arc face. The rear wall portion 26C extends from a rear edge of the side wall portion 26A towards the seat width direction inside. A leading end portion of the rear wall portion 26C is bent so as to be inclined towards the vehicle front side. The width of the rear wall portion 26C is set sufficiently wider than the width of the front wall portion 26B. An attachment hole 34 (see FIG. 1) is provided to an upper portion side of the rear wall portion 26C.

Seat Back Board 16 Configuration

Detailed explanation follows regarding the configuration of the seat back board 16 serving as a seat configuration member that is a relevant portion of the vehicle seat 10 of the present exemplary embodiment. As illustrated in FIG. 1 to FIG. 4 (in particular in FIG. 1 and FIG. 2), the seat back board 16 includes a back board portion 36 that is formed from a resin plate member and is disposed at a back face side of the seatback frame 14, and a back spring section 38 that is made from resin and integrally provided to the back board portion 36, that is directly supported spanning between the pair of left and right side frames 26, and that is formed so as to be capable of undergoing flexing deformation in a load application direction (towards the vehicle rear side) when load acts towards the seatback rear side.

The back board portion 36 is configured including a board body 40 that is formed slightly smaller than the seatback frame 14, and an anchor portion 42 integrally formed as a Substantially U-shaped groove to locations at an outer peripheral portion of the board body 40. More specifically, the board body 40 is formed slightly smaller than an inner peripheral edge of an opening portion of the rectangular frame shaped seatback frame 14. In an assembled state to the seatback frame 14, the board body 40 is disposed between and slightly towards the vehicle rear side of the leading end portions (inner end portions) of the rear wall portions 26C of the left and right side frames 26. The board body 40 can accordingly be assembled from the vehicle front side of the seatback frame 14 (see FIG. 3). The cross-section profile of the anchor portion 42 is configured in a U-shape open towards the vehicle rear side. The anchor portion 42 is employed to anchor an outer peripheral portion of the cover 20, however the anchor portion 42 also has a function of reinforcing the plate shaped board body 40 and increasing the surface rigidity of the overall back board portion 36.

The back spring section 38 is configured from a lower side back spring portion 44 integrally formed to a lower portion side of the back board portion 36, and an upper side back spring portion 46 integrally formed to an upper portion side of the back board portion 36. The upper side back spring portion 46 is provided independently, at a position separated from the lower side back spring portion 44 by a specific separation distance in the seatback height direction.

The lower side back spring portion 44 is configured by 3 lower side back spring body portions 48 disposed in three top-to-bottom parallel tiers along the seatback height direction and a pair of left and right lower side coupling and fixing portions 50 serving as both side portions that couple together both length direction end portions of the 3 lower side back spring body portions 48 along the seatback height direction, that are coupled to the back board portion 36, and that are fixed to the side frames 26. Note that the number of the lower side back spring body portions 48 configuring the lower side back spring portions 44 may be set as desired, and varied as appropriate based on a relationship with the required cushioning properties. Configuration may accordingly be made with a single lower side back spring body portion with a widened top-to-bottom width, or configuration may be made with two, or four or more, plural lower side back spring body portions.

The lower side back spring body portions 48 are formed with a wave shaped plan view cross-section profile, and are configured such that wave shaped portions 48A stretch when load acts towards the back board portion 36 side (the vehicle rear side), thereby undergoing flexing deformation (resilient deformation) towards the back board portion 36 side that is the load application direction. Note that vertical resin clip portions 58, described later, for attaching the cover 20, are integrally formed in the vicinity of both length direction end portions 48B of the upper tier and middle tier lower side back spring body portions 48. The wave shaped portions 48A are not formed within the range in which the vertical resin clip portions 58 are formed.

As illustrated in FIG. 3, the back board portion 36 is disposed at a position separated from the lower side back spring portion 44 by a specific separation distance towards the vehicle rear side. Namely, a specific gap 52 is formed between the lower side back spring portion 44 and the back board portion 36. The lower side back spring body portions 48 are capable of undergoing resilient deformation within the range of the gap 52. Namely the back board portion 36 also functions as a limiting member that limits the deflection of the lower side back spring portion 44 to a specific amount or below.

The lower side coupling and fixing portions 50 are each formed with a substantially inverted U-shape in plan view cross-section, and include inside side walls 50A that couple together the length direction end portions 48B of the lower side back spring body portions 48, outside side walls 50B that are disposed parallel to the inside side walls 50A and are anchored to outside faces of the side wall portions 26A of the side frames 26 in a face-to-face contact state, front walls 50C that couple together front ends of the inside side walls 50A and front ends of the outside side walls 50B in the vehicle width direction, and are partially anchored to the front wall portions 26B of the side frames 26 in a face-to-face contact state, and rear walls 50D that are coupled to the back board portion 36 and to the length direction end portions 48B of the lower side back spring body portions 48 from rear end portions of the inside side walls 50A.

Both of the length direction end portions 48B of the three top-to-bottom tiers of the lower side back spring body portions 48 described above are respectively configured by flat portions not formed with the wave shaped portions 48A, and are coupled together by the pair of left and right lower side coupling and fixing portions 50. Namely, although plural tiers of the lower side back spring body portions 48 are provided in the seatback height direction, both length direction end portions of the respective lower side back spring body portions 48 are coupled by the pair of left and right lower side coupling and fixing portions 50, thereby integrating the lower side back spring portion 44 with the back board portion 36. Note that a length direction dimension of the lower side coupling and fixing portions 50 is set so as to include a range from the upper edge of the uppermost tier lower side back spring body portion 48 to the lower edge of the lowermost tier lower side back spring body portion 48.

The lower side coupling and fixing portions 50 are fixed to the side frames 26 by fixing the outside side walls 50B of the lower side coupling and fixing portions 50 to the attachment holes 32 of the side wall portions 26A of the side frames 26 from the seat width direction outer side using a fixing means, not illustrated in the drawings. Note that various configurations may be applied for the fixing means, including for example engaging integrally formed resin clips of the outside side walls 50B with the attachment holes 32, fastening using fastening implements such as rivets, screws, bolts and weld nuts, and adhering using structural adhesives. In the fixed state of the lower side coupling and fixing portions 50 to the side frames 26, the rear walls 50D are disposed parallel to the rear wall portions 26C of the side frames 26. The length direction end portions 48B of the lower side back spring body portions 48 are accordingly disposed in a state in which they enter the inside of the cross-section of the side frames 26.

The upper side back spring portion 46 has the same basic configuration as the lower side back spring portion 44, and is configured by a an upper side back spring body portion 54 and upper side coupling and fixing portions 56. The upper side back spring body portion 54 is formed with a wave shaped portion 54A that stretches and undergoes flexing deformation (resilient deformation) when load acts towards the back board portion 36 side (the vehicle rear side). Both length direction end portions 54B of the upper side back spring body portion 54 are integrally formed with vertical resin clip portions 58, and both length direction end portions 54B and a central portion are integrally formed with horizontal resin clip portions 60. The upper side coupling and fixing portions 56 are shaped so as to stick out towards the seatback width direction outer sides, and are set with a length direction dimension that fits between the side wall portions 26A of the left and right side frames 26. The upper side coupling and fixing portions 56 are fixed to the attachment holes 34 of the rear wall portions 26C from the seat rear side using fixing means, not illustrated in the drawings, thereby fixing the upper side coupling and fixing portions 56 to the side frames 26.

Note that as described above, in the present exemplary embodiment, the back spring section 38 is split into the lower side back spring portion 44 and the upper side back spring portion 46, however there is no limitation thereto, and the two may be connected together and integrated. Namely, a configuration may be adopted wherein the lower side coupling and fixing portions 50 are extended towards the seatback upper side and coupled to both length direction end portions of the upper side back spring body portion 54.

In the present exemplary embodiment, the upper side back spring portion 46 is configured by a single tier (1 individual), however there is no limitation thereto, and a configuration may be adopted wherein a plural tiered (plural individuals) back spring portion is provided at even separations spanning from an upper portion to a lower portion of the back board portion 36.

Seatback Pad 18 Configuration

As illustrated in FIG. 1, the seatback pad 18 is broadly speaking configured by a pad central upper portion 62, a pad central lower portion 64, and a pair of left and right pad side portions 66. Note that the seatback pad 18 is manufactured from, for example, a urethane foam.

As illustrated in FIG. 4, the vertical cross-section profile of the pad central upper portion 62 is formed substantially in a top-bottom and left-right inverted J-shape. The pad central upper portion 62 is anchored to the upper frame 28 of the seatback frame 14 from the seatback upper side. The vertical cross-section profile of the pad central lower portion 64 is formed substantially in a left-right inverted J-shape. The pad central lower portion 64 forms a shape with a lower portion with a curved projecting profile that bulges further towards the vehicle front side than an upper portion. The pad central lower portion 64 is anchored from a seatback lower side to a connecting rod 68 that couples together lower end portions of the side frames 26 along the seat width direction. Note that the connecting rod 68 is disposed parallel to the front side of the lower frame 30 of the seatback frame 14.

Moreover, as illustrated in FIG. 3, the pad side portions 66 are respectively configured with a substantially C-shaped profile in horizontal cross-section. The pad side portions 66 are mounted to the side frames 26 so as to wrap around the side frames 26 to which the lower side coupling and fixing portions 50 are in a mounted state. Note that the respective pad side portions 66 are configured with a shape wherein a lower portion with a projecting curved face profile bulges further towards the vehicle front side than an upper portion. The pad side portions 66 bulge further towards the vehicle front side than the pad central upper portion 62 and the pad central lower portion 64, thereby configuring a shape that secures side support properties for an occupant.

Returning to FIG. 4, as viewed in vertical cross-section, the seat back board 16 is disposed so as to span from a back face side lower end portion 62A of the pad central upper portion 62 to a back face side upper end portion 64A of the pad central lower portion 64. To be precise, the back face side upper end portion 64A of the pad central lower portion 64 is formed thinner than the back face side lower end portion 62A, with a lower end portion of the back board portion 36 disposed front-rear superimposed with the thinned portion.

A horizontal slit 70 serving as a communication groove for tucking in the cover is formed between the pad central upper portion 62 and the pad central lower portion 64 described above. A pair of left and right vertical slits 72 (see FIG. 1) serving as communication grooves for tucking in the cover are respectively formed between the pad central upper portion 62 and pad central lower portion 64 and the pad side portions 66. The slit widths of the horizontal slit 70 and the vertical slits 72 are respectively set with lengths that allow insertion of the vertical direction attachment members 22 and the horizontal direction attachment member 24, described later. Each of the horizontal slit 70 and the vertical slits 72 are formed in straight line shapes, and penetrate the seatback pad 18 in the thickness direction (that is also the vehicle front-rear direction).

Cover 20 and Cover 20 Attachment Structure

As illustrated in FIG. 1, the cover 20 is formed with a size capable of covering the seatback pad 18 from the front face side. The cover 20 is moreover provided with a cover central upper portion 74, a cover central lower portion 76, and a pair of left and right cover side portions 78, corresponding to the split configuration of the seatback pad 18.

The cover 20 is attached to the seat back board 16 by the vertical direction attachment members 22, the horizontal direction attachment member 24, the vertical resin clip portions 58, the horizontal resin clip portions 60 and the outer peripheral anchor portions 80.

Figure 5:
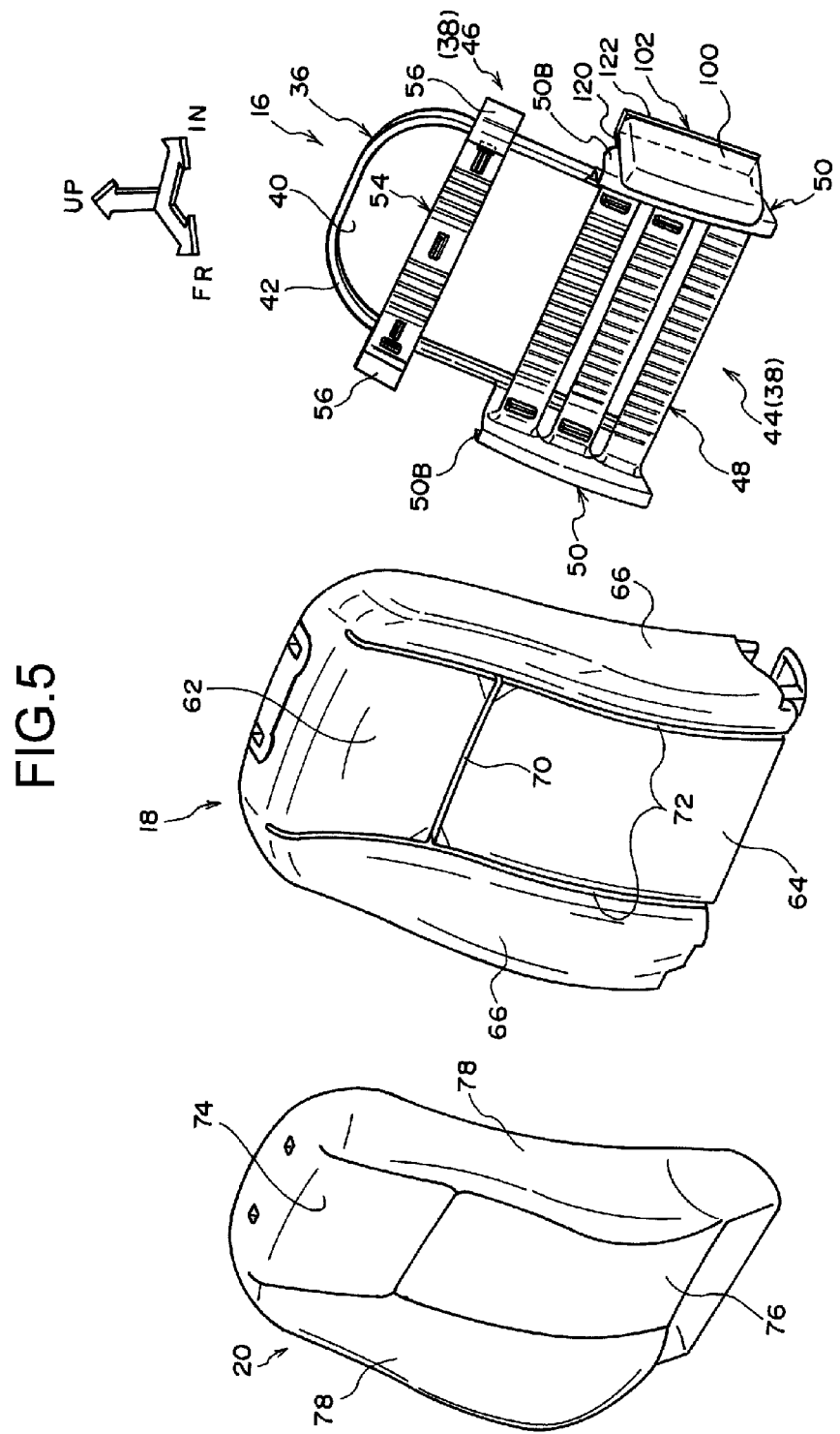
FIG. 5 is an exploded perspective view to explain an assembly process from the seat back board to the cover illustrated in FIG. 1.

As illustrated in FIG. 1, FIG. 3 and FIG. 5, the vertical direction attachment members 22 are respectively configured by a strap shaped attachment member body 22A and a substantially wedge shaped resin-formed engagement portion 22B provided at one side edge of the attachment member body 22A. The attachment member bodies 22A are configured by members of similar softness to the cover 20, with overall length set at a length capable of spanning between the vertical resin clip portions 58, described later, formed to the upper side back spring body portion 54 and the vertical resin clip portions 58 formed to one or to two or more of the lower side back spring body portions 48. The other side edge of the attachment member body 22A is embedded in a central portion of the engagement portion 22B by insert molding. The attachment member body 22A and the engagement portion 22B are thereby integrated together. The other side edges of the attachment member bodies 22A are attached in advance by sewing to the cover central upper portion 74, the cover central lower portion 76, and the cover side portions 78 (see FIG. 3). Note that although in FIG. 1 the vertical direction attachment members 22 (and the horizontal direction attachment member 24) are depicted separately from the cover 20, the vertical direction attachment members 22 (and the horizontal direction attachment member 24) are attached in advance to the back face side of the cover 20.

After insertion through the vertical slits 70 of the seatback pad 18, the vertical direction attachment members 22 described above resiliently engage with the vertical resin clip portions 58 of the back spring section 38. The vertical resin clip portions 58 are integrally formed to both length direction end portions 48B of the upper tier and middle tier lower side back spring body portions 48 and to both length direction end portions 54B of the upper side back spring body portion 54.

Since the total of 6 vertical resin clip portions 58 illustrated in FIG. 2 are all of the same basic configuration, explanation is given regarding the vertical resin clip portions 58 formed to the upper tier lower side back spring body portion 48 (the vertical resin clip portions 58 disposed over the line 3-3 in FIG. 2) as representative examples. The pair of left and right vertical resin clip portions 58 are disposed at both seat width direction outer sides of the wave shaped portion 48A configuring the resin spring of the lower side back spring body portion 48. The vertical resin clip portions 58 are formed with long, narrow projecting profiles that are long in the seatback height direction. Structurally, the vertical resin clip portions 58 are configured including: a pair of left and right leg portions 58A that project towards the seat front side from a front face of the lower side back spring body portion 48, are capable of undergoing resilient deformation in directions moving towards and away from each other, and have hooks formed at leading end portions thereof; and recess portions 58B that are formed between the leg portions 58A and are of a size that enables them to fit together with the engagement portions 22B of the vertical direction attachment members 22 described above. The recess portions 58B are formed continuously from upper end portions to lower end portions of the vertical resin clip portions 58.

Boundary portions of the cover central upper portion 74, the cover central lower portion 76 and the cover side portions 78 are configured so as to be pulled towards the seat back board 16 side and anchored by resiliently engaging the engagement portions 22B of the vertical direction attachment members 22 to the vertical resin clip portions 58 of the back spring section 38 in sequence from the top or in sequence from the bottom.

As illustrated in FIG. 1, FIG. 2 and FIG. 4, the horizontal direction attachment member 24 is disposed with length direction in the seat width direction, differing in this respect from the vertical direction attachment members 22 that are disposed with length direction in the seatback height direction. However, in other respects, configuration of the horizontal direction attachment member 24 is similar to that of the vertical direction attachment members 22. Namely, similarly to the vertical direction attachment members 22, the horizontal direction attachment member 24 is also configured by an attachment member body 24A that is formed in a strap shape, and a resin engagement portion 24B provided to one side edge of the attachment member body 24A and formed in a substantially wedge shape. The other side edge of the attachment member body 24A is attached in advance by sewing to the cover central upper portion 74 and the cover central lower portion 76. Similarly to the vertical resin clip portions 58, the horizontal resin clip portions 60 are configured by a pair of upper and lower leg portions 60A, and a recess portion 60B formed between the leg portions 60A.

As illustrated in FIG. 4, after inserting the horizontal direction attachment member 24 into the horizontal slit 70 of the seatback pad 18, the engagement portion 24B is resiliently engaged with the horizontal resin clip portions 60 of the back spring section 38, thereby achieving a configuration in which a boundary portion between the cover central upper portion 74 and the cover central lower portion 76 is pulled in towards the seat back board 16 side and anchored. Namely, the directions in which the cover 20 is pulled in by the horizontal direction attachment member 24 and by the vertical direction attachment members 22 differ from each other by 90 degrees.

As illustrated in FIG. 3 and FIG. 4, outer peripheral anchor portions 80 of which leading end portions are configured in an arrowhead shape are attached by sewing to outer peripheral portions of the cover 20 at appropriate positions. The outer peripheral anchor portions 80 are inserted deep inside the anchor portion 42 of the back board portion 36, thereby anchoring the outer peripheral portions of the cover 20 to the back board portion 36.

Side Airbag Device 100 Attachment Portion 102 Structure

Detailed explanation follows regarding the structure of an attachment portion 102 of a side airbag device 100 that is a relevant portion of the present exemplary embodiment, with reference to FIG. 1 to FIG. 3.

Brief explanation will first be given regarding the structure of the side airbag device 100. As illustrated in FIG. 1 to FIG. 3 (in particular in FIG. 3), the side airbag device 100 is configured including an airbag module 108 including an inflator 104 that actuates and generates gas in event of a side-on collision, a side airbag 106 that is folded up so as to cover the inflator 104, and a left and right pair of an outside force cloth 110 and an inside force cloth 112 serving as tension transmission members.

The inflator 104 is formed in a circular cylinder shape that is closed off at both end portions. A squib (ignition device), not illustrated in the drawings, is embedded at an axial center portion of an axial direction upper end portion of the inflator 104, and is connected to a connector through which current is passed. A gas ejection portion formed projecting coaxially from an axial direction lower end portion of the inflator 104 is formed with plural gas ejection holes. Functional components including an ignition agent, a combustion transmission agent, a gas generation agent, a coolant and a filter are embedded inside the inflator 104. The gas generation agent combusts when a current is passed through the squib, thereby generating a large quantity of gas. Note that an inflator type in which gas is sealed at high pressure may also be employed as well as an inflator type in which gas generation agent is sealed.

The inflator 104 is inserted inside a diffuser, not illustrated in the drawings, that is made from metal and is formed in a substantially circular cylinder shape. The diffuser is integrated with the inflator 104 by crimping an outer peripheral portion of the diffuser towards the radial direction inside in an inserted state of the inflator 104 inside the diffuser. Configuration is thereby made such that flow of the gas ejected from the plural gas ejection holes of the inflator 104 ris regulated by the diffuser. A pair of upper and lower stud bolts 114 (in FIG. 3, illustrated only by the single-dotted dashed line coupling line) project out towards the vehicle rear side from the outer peripheral portion of the diffuser.

As viewed from the side, the side airbag 106 is of a size that enables it to cover from the waist portion to the chest portion, shoulder portion or head portion of an occupant in a seated state. The side airbag 106 is configured so as to inflate and deploy between an outer side side portion of the upper body of the occupant in a seated state and a door trim of a side door.

The inflator 104 and the side airbag 106 described above are housed inside a module case (not illustrated in the drawings) that is made from metal and formed in a thin box shape that is open towards the vehicle front side.

As illustrated in FIG. 3, the outside force cloth 110 that transmits deployment force of the side airbag 106 to a splitting portion 116, described later, during inflation is disposed at the seatback width direction outer side of the side airbag device 100. The inside force cloth 112 that transmits deployment force of the side airbag 106 to the splitting portion 116 during inflation similarly to the outside force cloth 110 is disposed at the seatback width direction inside of the side airbag device 100. The outside force cloth 110 and the inside force cloth 112 are both formed in strap shapes, and employ for example the same material as the side airbag 106.

One end portion 110A of the outside force cloth 110 is fixed by sewing to a terminal portion of the cover side portion 78 that is configured by two sheets of cloth respectively disposed on both sides of the cover 20. Note that the sewn locations of the terminal portions of the two sheets of cloth configuring the cover side portion 78 are referred to as the "splitting portion 116". An intermediate portion 110B of the outside force cloth 110 is disposed so as to pass through a gap between an outside face of the side airbag device 100 and an inside face of the pad side portion 66. A metal bracket, not illustrated in the drawings, is attached to another end portion 110C of the outside force cloth 110.

One end portion 112A of the inside force cloth 112 is fixed by sewing to the splitting portion 116 similarly to the outside force cloth 110. An intermediate portion 112B of the inside force cloth 112 passes through a gap between a front end portion of the side airbag device 100 and an inside face of the pad central lower portion 64 and is inserted inside a vertically extending insertion through-hole 118 formed in the front wall 50C of the lower side coupling and fixing portion 50 (see FIG. 2 in particular). The intermediate portion 110B that passes through the insertion through-hole 118 is disposed between the outside side wall 50B of the lower side coupling and fixing portion 50 and the side wall portion 26A of the side frame 26. A metal bracket, not illustrated in the drawings, is attached to another end portion 112C of the inside force cloth 112.

The side airbag device 100 described above is attached to the attachment portion 102 provided to the seat width direction outer side lower side coupling and fixing portion 50 of the seat back board 16. The attachment portion 102 is integrally formed to the attachment outside side walls 50B of the lower side coupling and fixing portions 50. The attachment portion 102 is therefore formed from resin similarly to the seat back board 16. Configuration may however be made wherein the attachment portion 102 is formed as a separate body to the seat back board 16 and integrated thereto by fixing means such as welding.

The attachment portion 102 is formed in an L-shape in plan view, and is set with a height direction dimension similar to the height direction dimension of the side airbag device 100. The attachment portion 102 may however be set with any height direction dimension that allows stable fixing of the side airbag device 100. To elaborate further, the structure of the attachment portion 102 is configured including a vertical wall portion 120 extending from a rear end 50B1 (see FIG. 2) of the outside side wall 50B towards the seatback rear side, and a horizontal wall portion 122 extending from a rear end of the vertical wall portion 120 towards the seatback width direction outer side.

The vertical wall portion 120 is formed in substantially the same plane as the outside side wall 50B, and is formed so as to cover a portion of the outside face of the side wall portion 26A of the side frame 26 positioned on the seat width direction outer side (see FIG. 3). Note that in the present exemplary embodiment, the vertical wall portion 120 covers a portion of the outside face of the side wall portions 26A, however there is no limitation thereto, and configuration may be made such that the vertical wall portion 120 covers the entire outside face. For example, configuration may be made wherein both the outside side wall 50B of the lower side fixing portion 50 and the vertical wall portion 120 are treated as the "vertical wall portion" of the attachment portion 102, with this "vertical wall portion" covering the entire outside face of the side wall portion 26A. The horizontal wall portion 122 is configured with an attachment seating having a width direction dimension that allows attachment of the side airbag device 100 (for example, has a width direction dimension similar to the width direction dimension of the side airbag device 100, as in the present exemplary embodiment). Note that the horizontal wall portion 122 is formed with a pair of upper and lower bolt insertion through-holes (not illustrated in the drawings) that are coaxial to the stud bolts 114 described above.

The side airbag device 100 is disposed at the front side of the horizontal wall portion 122 that is configured as described above. The stud bolts 114 that project from the module case towards the vehicle rear side are inserted through the bolt insertion through-holes formed in the horizontal wall portion 122, and the side airbag device 100 is fastened and fixed together with the brackets provided to the other end portion 110C of the outside force cloth 110 and the other end portion 112C of the inside force cloth 112 using nuts 124 (in FIG. 3, illustrated only by the single-dotted dashed line coupling line). The side airbag device 100 is thereby fixed to the attachment portion 102. Note that depending on the size of the side airbag 106, 2 sets of the outside force cloth 110 and the inside force cloth 112 may be provided at separations in the seatback height direction. In such cases, either the top or the bottom outside force cloth and inside force cloth may be fixed to the side frame 26 separately to the side airbag device 100.

Operation and Advantageous Effects of the Present Exemplary Embodiment

Explanation follows regarding operation and advantageous effects of the present exemplary embodiment.

The vehicle seat 10 configured as described above is provided with the resin seat back board 16 with the resin back spring section 38 (resin spring) integrally formed to the resin back board portion 36. The seat back board 16 is fitted together with the metal seatback frame 14 from the vehicle front side. Specifically, the left and right lower side coupling and fixing portions 50 are fitted together with the left and right side frames 26 from the vehicle front side, and in this state the lower side coupling and fixing portions 50 are fixed to the side frames 26 from the seat width direction outer sides. Moreover, the left and right upper side coupling and fixing portions 56 are inserted inside the left and right side frames 26 from the vehicle front side, after which they are fixed to the left and right rear wall portions 26C from the vehicle front side. Then the side airbag device 100 is fixed to the attachment portion 102, and the seatback pad 18 is mounted to the seatback frame 14 from the vehicle front side, and the cover 20 to which the outside force cloth 110 and the inside force cloth 112 are sewn is covered over the seatback pad 18. The vertical direction attachment members 22 and the horizontal direction attachment member 24 are fixed in advance by sewing to the cover 20, and the vertical direction attachment members 22 and the horizontal direction attachment member 24 are inserted inside the corresponding vertical slits 72 and the horizontal slit 70 and anchored to the respective vertical resin clip portions 58 and horizontal resin clip portions 60 whilst covering the cover 20 over the seatback pad 18. The outer peripheral anchor portions 80 of the cover 20 are than anchored to the anchor portion 42 of the back board portion 36.

The seatback 12 assembled as described above thus configures the vehicle seat 10 to which the seat cushion 11 and the headrest, not illustrated in the drawings, are attached. When an occupant sits in the vehicle seat 10, load (illustrated by the arrow F in FIG. 3) towards the seatback rear side is input into the back spring section 38 through the cover 20 and the seatback pad 18. The lower side back spring body portions 48 and the upper side back spring body portion 54 accordingly undergo flexing deformation towards the seatback rear side that is the load application direction. When this occurs, a reaction force (indicated by the arrow f in FIG. 3) from the side frames 26 towards the vehicle front side arises since the load is transmitted to the left and right side frames 26 through the lower side coupling and fixing portion 50 and the upper side coupling and fixing portions 56.

When load is thus input from the occupant to the back spring section 38, the back spring section 38 itself undergoes flexing deformation, thereby making a contribution towards securing the cushioning properties of the seatback 12. The load itself is transmitted to the left and right side frames 26 and supported by the left and right side frames 26. As a result, adequate cushioning performance can be secured in the seatback 12. The resin-formed back spring section 38 is moreover integrally provided with the back board portion 36, thus enabling the number of components and the number of assembly steps to be reduced in comparison to when the back spring section 38 is configured by a metal seatback spring. As a result, according to the present exemplary embodiment adequate cushioning performance can be secured for the seatback 12, whilst also enabling a further reduction in weight and reduction in costs to be achieved.

In the present exemplary embodiment, the attachment portion 102 is integral with or integrally provided at the lower side fixing portion 50 disposed at the seat width direction outer side of the seat back board 16. Accordingly, as illustrated in FIG. 5, the side airbag device 100 can be attached in advance to the attachment portion 102. In other words, the side airbag device 100 can be integrated in advance on the side of the seat back board 16, that is made from resin, rather than the seatback frame 14. The following assembly process is accordingly made possible when assembling the seatback 12 of the vehicle seat 10. Namely, the cover 18 is covered over the seatback pad 18 in tandem with the operation to integrate together the side airbag device 100 and the seat back board 16, described above. The seatback pad 18 subassembly is then assembled to the seat back board 16 subassembly from the seat front side. Specifically, after respectively inserting the left and right vertical direction attachment members 22 into the corresponding vertical slits 72, the vertical direction attachment members 22 are engaged with the vertical resin clip portions 58. Similarly, after the horizontal direction attachment member 24 is inserted inside the horizontal slit 70, the horizontal direction attachment member 24 is engaged with the horizontal resin clip portions 60. Then, the outer peripheral anchor portions 80 of the cover 20 can be anchored to the outer peripheral anchor portion 42 of the back board portion 40 to form a subassembly of portions of the seatback 12 other than the seatback frame 14. Finally, this subassembly can be fixed to the side frames 26 of the seatback frame 14. When doing so, the subassembly may be fitted to the seatback frame 14 from the seat upper side, and the subassembly may also be fitted together with the seatback frame 14 from the seat front side. Therefore, in the present exemplary embodiment, assembly of the seatback 12 is finally completed by simply fixing the respective left and right lower side coupling and fixing portions 50 and upper side coupling and fixing portions 56 of the seat back board 16 to which the side airbag device 100 has been integrated to the left and right side frames 26 of the seatback frame 14.

In particular, in the present exemplary embodiment, the side airbag device 100 can be assembled to the seat back board 16 in advance even when the outside force cloth 110 and the inside force cloth 112 are set at a back face side of the cover 20. Specifically, the bracket provided to the other end portion of the inside force cloth 112 is passed through the insertion through-hole 118 of the lower side coupling and fixing portion 50 that is adjacent to the attachment portion 102. This bracket passes through the inside of the outside side wall 50B of the lower side coupling and fixing portion 50, and is penetrated by the stud bolts 114. Similarly, the bracket provided to the other end portion of the outside force cloth 110 is passed to the outside of the side airbag device 100 and is penetrated by the stud bolts 114. The nuts 124 are then screwed onto the stud bolts 114. The wrapping of the outside force cloth 110 and the inside force cloth 112 around the side airbag device 100 can therefore be completed prior to assembling the seat back board 16 to the seatback frame 14. The need to fix the metal brackets of the force cloths to the side frame whilst rolling up the cover, that is required in conventional configurations, is thereby dispensed with. The ease of assembly of the seatback 12 is therefore improved as a result, whilst the degrees of freedom for assembly are increased. Since there is no longer a requirement to roll up the cover, there is no longer a need to set fasteners on the cover. The number of components can accordingly be reduced.

As a result of the above, according to the seat back board and vehicle seat employing the seat back board of the present exemplary embodiment, good ease of assembly can be maintained for the seatback 12 even when provided with the side airbag device 100, as well as increasing the degrees of freedom for assembly. The number of components can also be reduced. Reducing the number of components moreover enables a cost saving to be achieved.

Moreover, in the present exemplary embodiment, since the seat back board 16 can be assembled to the side frames 26 from the seat front side, the assembly operation is easier than in a case in which the seat back board 16 is assembled to the side frames 26 from the seat rear side. The ease of assembly of the seatback 12 can accordingly be increased even further.

In the present exemplary embodiment, during inflation and deployment of the side airbag 106, the inflation pressure of the side airbag 106 acts on the left and right outside force cloth 110 and inside force cloth 112. Tension accordingly arises in the left and right outside force cloth 110 and inside force cloth 112 and is transmitted to the splitting portion 116 set in the cover 20. The splitting portion 116 is accordingly pulled in a pulling open direction. The splitting portion 116 splits open as a result, and the side airbag 106 inflates and deploys towards the seat front side. As a result, the side airbag 106 can be made to deploy swiftly towards the seat front side in event of a side-on collision.

Moreover, in the present exemplary embodiment the front wall 50C of the seatback width direction outer side lower side coupling and fixing portion 50 of the seat back board 16 is formed with the insertion through-hole 118 for insertion of the inside force cloth 112. The inside force cloth 112 is inserted through the insertion through-hole 118 and fixed to the attachment portion 102. The layout path of the inside force cloth 112 can accordingly be shortened. As a result, inflation pressure of the side airbag 106 can be efficiently transmitted to the inside force cloth 112, and the splitting portion 116 can be made to split swiftly, enabling a faster deployment time for the side airbag 106.

In the present exemplary embodiment, the seat back board 16 is integrally provided with the back board portion 36 and the back spring section 38, enabling a reduction in the number of components in comparison to when these elements are provided separately. The seatback can moreover be made lighter than when employing metal seat springs. The cushioning properties of the seatback 12 can be enhanced due to providing plural tiers of the lower side back spring body portions 48 in the seatback height direction. The present exemplary embodiment can accordingly improve the sitting comfort of the seated occupant, and also achieve a reduction in cost and a reduction in weight.

In the present exemplary embodiment, the side airbag device 100 is attached to the attachment portion 102 of the seat back board 16 as described above. The side airbag device 100 can accordingly be configured in a seat back board 16 side subassembly. An assembly process of the side airbag device 100 itself to the side frame 26 of the seatback frame 14 can accordingly be eliminated. As a result, in the present exemplary embodiment an assembly operation of the seatback 12 provided with the side airbag 106, and therefore of the vehicle seat 10, can be performed easily and within a short space of time.

Second Exemplary Embodiment

Figure 6:
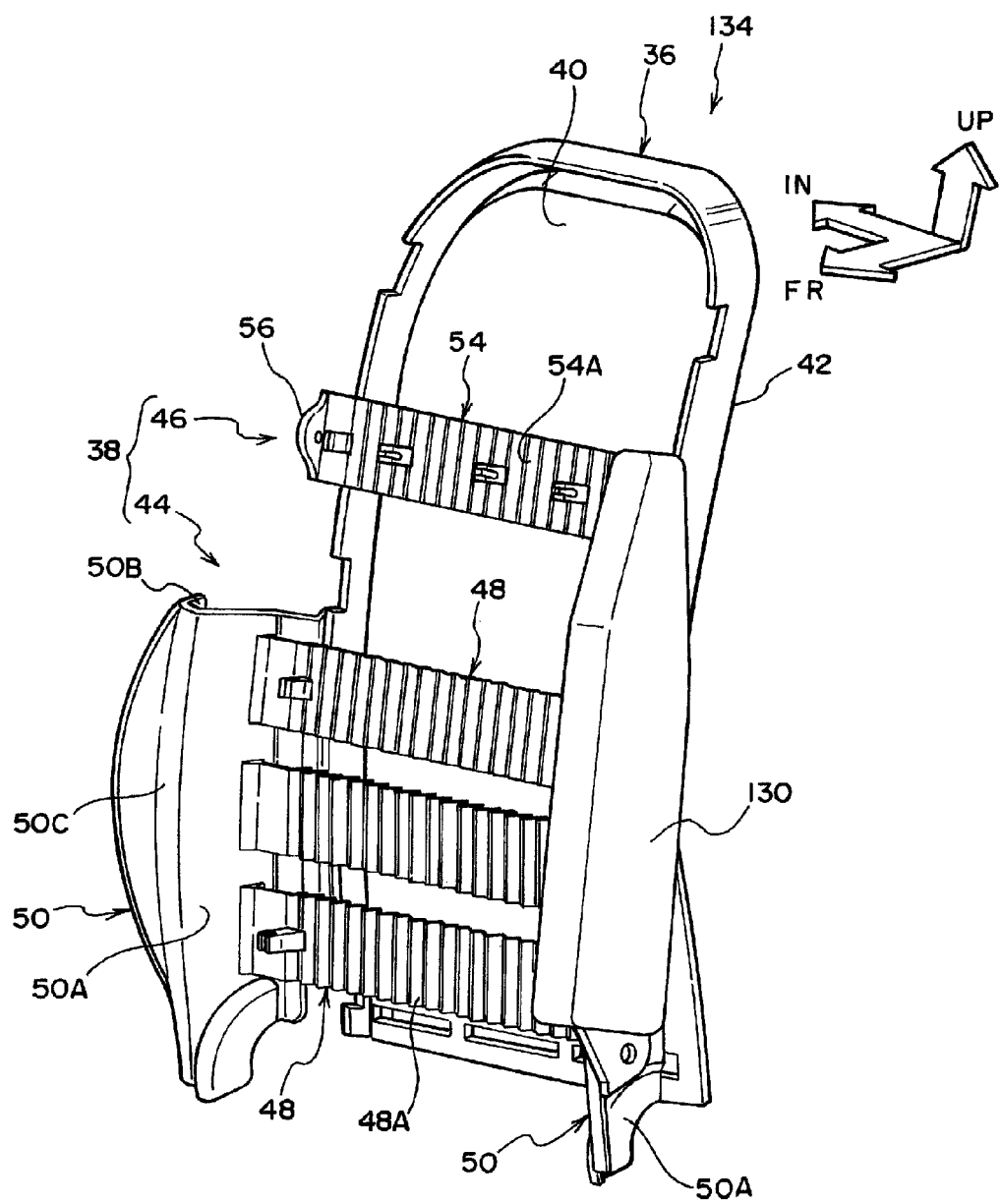
FIG. 6 is a perspective view illustrating a seat back board according to a second exemplary embodiment, as viewed from a front face side.
Figure 7:
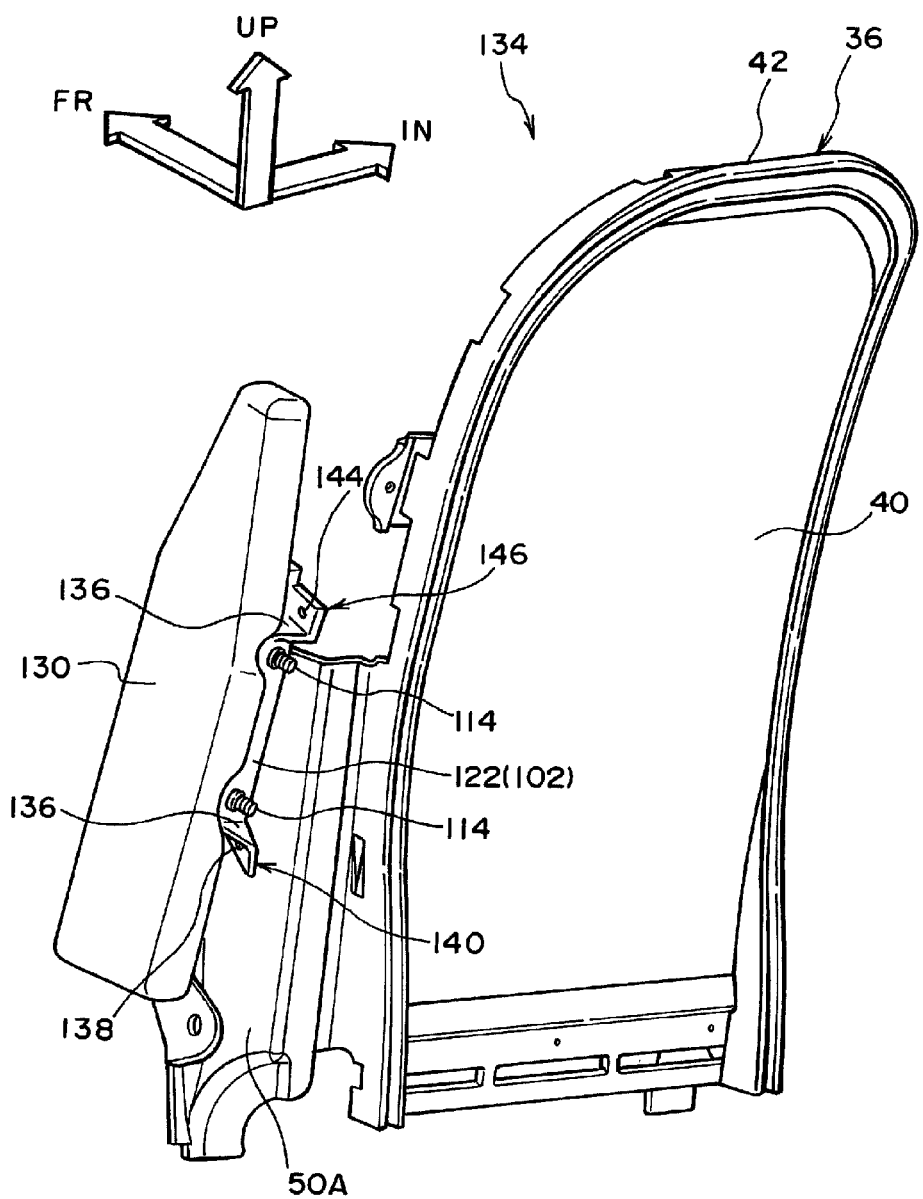
FIG. 7 is a perspective view illustrating the seat back board illustrated in FIG. 6, as viewed from a back face side.
Figure 8:
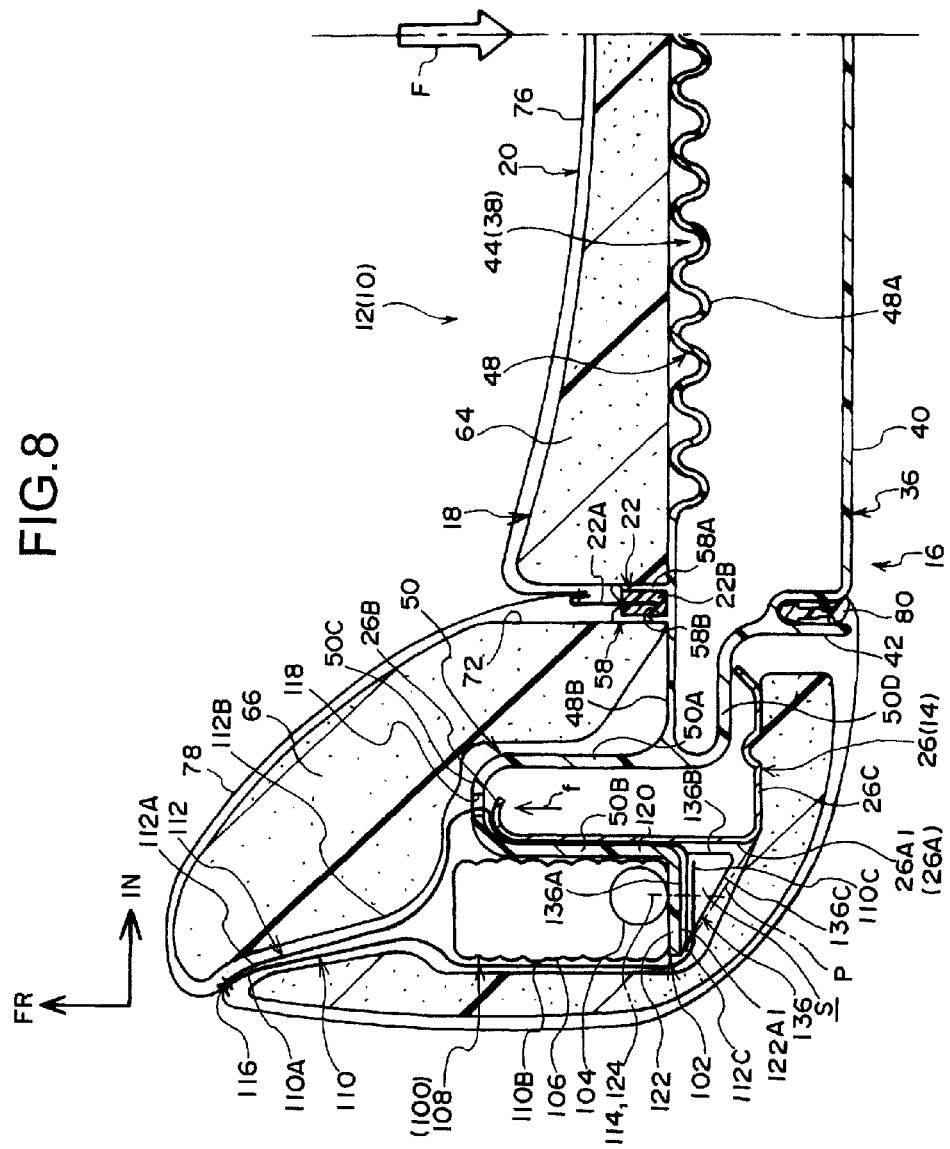
FIG. 8 is an enlarged plan view cross-section corresponding to FIG. 3, illustrating an assembled state of a seatback provided with a seat back board according to the second exemplary embodiment.

Explanation follows regarding a second exemplary embodiment of a seat configuration member and a vehicle seat employing the seat configuration member of the present invention, with reference to FIG. 6 to FIG. 8. Note that configuration portions similar to those of the first exemplary embodiment described above are allocated the same reference numerals and explanation thereof is omitted.

As illustrated in FIG. 6 to FIG. 8, in the second exemplary embodiment a side airbag device 130 is employed that has a large size in the seatback height direction. In FIG. 6 and FIG. 7, the side airbag device 130 is accordingly illustrated with a greater vertical length than the side airbag device 100 of the first exemplary embodiment.

The basic structure of a seat back board 134 is the same as that of the seat back board 16 of the first exemplary embodiment. The seat back board 134 accordingly includes the back board portion 36, and the back spring section 38 including the lower side back spring portion 44 and the upper side back spring portion 46. As illustrated in FIG. 7 and FIG. 8, the lower side coupling and fixing portion 50 disposed on the seatback width direction outer side is integrally formed with the attachment portion 102 for attaching the side airbag device 130.

The second exemplary embodiment is characterized by the point that plural (a pair of upper and lower) ribs 136 serving as a reaction force receiving portions are integrally formed in (right-angled) triangle shapes to a back face side of the horizontal wall portion 122 of the attachment portion 102 as seen in plan view. Specifically, as illustrated in FIG. 7, an upper end portion and a lower end portion of the horizontal wall portion 122 of the attachment portion 102 are respectively formed with bolt insertion through-holes 118 for inserting the pair of upper and lower stud bolts 114 projecting from the module case.

A lower side attachment seating 140 that is integrally provided extending from a lower end portion of the horizontal wall portion 122 (namely at a lower side of a bolt fastening portion of the inflator 104) is formed with a bolt insertion through-hole 138 for fastening and fixing the bracket of the outside force cloth 110 and the bracket of the inside force cloth 112 that are disposed on the lower side. One of the ribs 136 is integrally formed at a connection location between the lower side attachment seating 140 and the horizontal wall portion 122 and has a right-angled triangle shape in plan view.

As illustrated in FIG. 8, the ribs 136 extend in an orthogonal direction that is an example of a direction intersecting with the horizontal wall portion 122. A bottom edge portion 136A that is one edge of the rib 136 is formed integrally connected to the horizontal wall portion 122. A vertical portion 136B that is one other edge of the rib 136 is disposed so as to approach the side wall portion 26A of the side frame 26. Namely, the vertical portion 136B is disposed so as to face the side wall portion 26A across a gap, such that the vertical portion 136B contacts the side wall portion 26A when the horizontal wall portion 122 deforms in the opening direction with respect to the vertical wall portion 120. An inclined edge portion 136C that is the other edge of the other rib 136 is disposed substantially parallel to and so as not to impinge on the inside face of the pad side portion 66 of the seatback pad 18. Namely, the ribs 136 are formed within a range S enclosed by an outside face 26A1 of the side wall portion 26A of the side frame 26, a seat front-rear direction rear face 122A1 of the horizontal wall portion 122, and a plane (single-dotted dashed line P) that joins together a seat front-rear direction rear edge of the outside face 26A1 and a seat width direction outer side edge of the outside face 26A1.

Similarly, as illustrated in FIG. 7, an upper side attachment seating 146 that is integrally provided extending from an upper end portion of the horizontal wall portion 122 (namely at an upper side of the bolt fastening portion of the inflator 104) is formed with a bolt insertion through-hole 144 for fastening and fixing the bracket of the outside force cloth 110 and the bracket of the inside force cloth 112 that are disposed on the upper side. The rib 136 is integrally formed at a connection location between the upper side attachment seating 146 and the horizontal wall portion 122 and has a right-angled triangle shape in plan view. The rib 136 itself is of similar configuration to the rib 136 provided to the lower side attachment seating 140.

Operation and Advantageous Effects

Since the above configuration builds on the configuration of the first exemplary embodiment described above, similar operation and advantageous effects are obtained thereto.

Moreover, in the present exemplary embodiment, when the side airbag device 130 is actuated and the side airbag 106 deploys, a deployment reaction force is transmitted to the horizontal wall portion 122. Namely, the horizontal wall portion 122 is pushed towards the seat rear side whilst turning in a direction so as to open out with respect to the vertical wall portion 120. In the present exemplary embodiment, the back face side of the horizontal wall portion 122 is formed with the ribs 136 that form right-angled triangle shapes in plan view. Accordingly, when the horizontal wall portion 122 undergoes rotational displacement towards the side frame 26 side about the connection location (angle portion) between the horizontal wall portion 122 and the vertical wall portion 120, the vertical portions 136B of the ribs 136 almost immediately contact the side wall portion 26A of the side frame 26. The deployment reaction force of the side airbag 106 acting on the horizontal wall portion 122 is accordingly supported by the ribs 136. As a result, the side airbag 106 inflates and deploys with a desired timing and in the desired direction (towards the seatback front side). The side airbag 106 can accordingly be made to inflate and deploy swiftly and precisely.

In the present exemplary embodiment, the ribs 136 are disposed such that the bottom edge portion 136A is connected to the horizontal wall portion 122, and the vertical portion 136B is disposed so as to capable of contacting the side frame 26. The ribs 136 can accordingly be integrally molded during molding of the seat back board 16. In the present exemplary embodiment, an increase in the number of components can be suppressed, and a reduction in costs can also be achieved as a result.

In the present exemplary embodiment, the ribs 136 are formed within the range S that is enclosed by the outside face 26A1 of the side wall portion 26A of the side frame 14 positioned on the seat width direction outer side, the seat front-rear direction rear face 122A1 of the horizontal wall portion 122, and the plane (single-dotted dashed line P) that joins together the seat front-rear direction rear edge of the outside face 26A1 and the seat width direction outer side edge of the outside face 26A1, thereby enabling the likelihood of the seatback pad 18 impinging on the ribs 136 to be reduced. As a result, in the present exemplary embodiment damage to the seatback pad 18 from the ribs 136 can be suppressed or prevented. Providing the ribs 136 inside the range S moreover obtains the advantageous effect of enabling easier assembly of the seatback pad 18 to the seat back board 16.

Note that in the present exemplary embodiment, the ribs 136 are configured with a right-angled triangle shape in plan view, however there is no limitation thereto and the shape of the ribs 136 may be varied as desired, and may be for example a triangle shape other than a right-angled triangle, or a trapezoidal shape.

Supplementary Explanation of the Above Exemplary Embodiments

In the exemplary embodiments described above, the resin back spring section 38 is integrally formed to the resin back board portion 36, however there is no limitation thereto and a resin back spring section may be integrally provided to a resin back board portion. Namely, the back board section and the back spring section may be manufactured separately and then integrated together by for example welding. Configuration may also be made wherein the back spring body portion and the coupling and fixing portions configuring the back spring section are manufactured as separate components and integrated together by for example welding. To elaborate further, in the above exemplary embodiments, for example in the first exemplary embodiment, explanation has been given wherein the lower side coupling and fixing portions 50 are configuration elements on the lower side back spring portion 44 (back spring section 38) side, however the lower side coupling and fixing portions 50 may also be regarded as back board portion 36 side configuration elements. This is due to the fact that in the completed state of the seat back board, the issue of whether the configuration element of the coupling and fixing members are included on the back spring section side or included on the back board portion side is merely one of classification.

In the exemplary embodiments described above, the lower side coupling and fixing portions 50 of the seat back board 16 are formed with an inverted substantially U-shape in plan view cross-section, however there is no limitation thereto and configuration may be made with a shape in which the outside side wall 50B is omitted. In such cases, the lower side coupling and fixing portions of the seatback frame may be fitted into the left and right side frames 26 of the seatback frame 14 from the vehicle front side and fixed to the front wall. Depending on the plan view cross-section profile of the side frames, the side frames may be fixed to the inside side walls of the seatback frame.

The invention claimed is:

1. A seat configuration member for use with a side airbag device that inflates and deploys a side airbag toward a seat front side in the event of a side-on collision, the seat configuration member comprising:
   left and right respective side portions that are respectively fixed to left and right side frames provided at a seatback frame that is made from metal, the left and right side portions being formed of a resin material;
   at least one back spring body portion disposed along a seat width direction between a back board portion disposed at a back face side of the seatback frame and the pair of left and right side frames, the at least one back spring body portion or the back board portion being formed of a resin material; and
   an attachment portion including an attachment seating for attaching the side airbag device, the attachment portion being formed of a resin material, wherein
   the attachment portion, one of the left and right side portions, and at least one of the back board portion or the back spring body portion, are formed as one piece.

2. The seat configuration member of claim 1, wherein the respective side portions of the seat configuration member fit together with front sides of the side frames.

3. The seat configuration member of claim 1, further comprising:
   a cloth-form tension transmission member that is disposed at least at a seat width direction inner side of the side airbag, and that transmits tension received from the side airbag as a pulling force that pulls open a splitting portion set in a cover.

4. The seat configuration member of claim 3, wherein:
   an insertion through-hole through which the tension transmission member is inserted is formed at a seat width direction outer side portion of the seat configuration member; and
   the tension transmission member is passed through the insertion through-hole and is fixed to the attachment portion.

5. The seat configuration member of claim 1, wherein:
   the attachment portion includes: (i) a vertical wall portion that extends in a seat front-rear direction so as to cover at least a portion of an outside face of the side frame positioned on the seat width direction outer side, and (ii) a horizontal wall portion that extends from the vertical wall portion towards the seat width direction outer side, and that configures the attachment seating of the attachment portion; and the horizontal wall portion includes a back face side that is provided with a reaction force receiving portion that extends in a direction intersecting with the horizontal wall portion, and that receives a deployment reaction force of the side airbag.

6. The seat configuration member of claim 5, wherein the reaction force receiving portion comprises a rib with one end connected to the horizontal wall portion and the other end disposed so as to be capable of contacting the side frame.

7. The seat configuration member of claim 5, wherein the reaction force receiving portion is formed within a range enclosed by: (i) an outside face of the side frame positioned at the seat width direction outer side, (ii) a seat front-rear direction rear face of the horizontal wall portion, and (iii) a plane that joins together a seat front-rear direction rear end of the outside face and a seat width direction outer side end of the rear face.

8. The seat configuration member of claim 1, wherein:
the respective side portions, the back spring body portion, and the back board portion are integral with or integrally provided at the respective side portions; and
a plurality of tiers of the back spring body portions are provided along the seatback height direction.

9. The seat configuration member of claim 1, wherein the side airbag device is attached to the attachment portion.

10. A vehicle seat, comprising:
a seatback frame provided with a pair of left and right side frames;
the seat configuration member of claim 1, the back board portion being supported at the pair of left and right side frames of the seatback frame;
a seatback pad disposed at a front face side of the back board portion; and
a cover that covers a front face of the seatback pad.

11. The seat configuration member of claim 1, wherein the attachment portion and one of the left and right side portions is monolithically formed in one piece.

* * * * *